United States Patent [19]

Goodman et al.

[11] Patent Number: 4,881,400
[45] Date of Patent: Nov. 21, 1989

[54] CONTINUOUS MEASURING DIAPHRAGM PRESSURE GAGE

[75] Inventors: Henry J. Goodman, Baltimore; Evan H. Walker, Aberdeen, both of Md.; Emmett L. Bell, Glennville, Ga.

[73] Assignee: The United States of America as represented by the Secretary of The Army, Washington, D.C.

[21] Appl. No.: 248,761

[22] Filed: Sep. 22, 1988

[51] Int. Cl.[4] .................... G01N 33/22; F16K 17/40
[52] U.S. Cl. ......................................... 73/35; 73/709; 220/89 A
[58] Field of Search .............. 73/35, 709, 493, 862.53, 73/762; 220/89 A, 207

[56] References Cited

U.S. PATENT DOCUMENTS 1,344,722  6/1920  Schulz ..................................... 73/35
4,777,974  10/1988  Swift et al. .................... 220/89 A X Primary Examiner—Charles A. Ruehl
Attorney, Agent, or Firm—Saul Elbaum; Walter R. Baylor

[57] ABSTRACT

A mechanical pressure gage for measuring the change in fluid pressure resulting from an explosive charge and the like. The sealed gage housing includes a plate member having a recess in which a metalic foil diaphragm means is frictionally mounted therein. The plate member has a wedged-shaped opening centrally located on the plate member and extending therethrough. The diaphragm means covers the wedged-shaped opening and is adapted to be mechanically deformed by a change in the fluid pressure within the housing. A cover plate for the housing also has a corresponding wedged-shaped opening and has scale marking located adjacent to the edge for measuring the extent of the rupture of the diaphragm means upon the fluid pressure change. Another plate member forms a back to the housing.

4 Claims, 3 Drawing Sheets

CONTINUOUS MEASURING DIAPHRAGM PRESSURE GAGE

RIGHTS OF THE GOVERNMENT

The invention described herein may be manufactured, used, and licensed by or for the United States Government for governmental purposes without payment to us of any royalty thereon.

BACKGROUND OF THE INVENTION

This invention relates to a pressure gage that can be used in various environments to measure the peak overpressure of pressure transients in various media over a continuous and wide range of pressures.

Diaphragm pressure gages are well known in the art. Such gages provide a convenient and inexpensive method to measure the peak overpressure due to explosions in air, or other forms of pressure transients, occurring too rapidly to follow or be followed by static pressure devices such as manometers or that must be monitored remotely due to hazards presented by the explosive environment. These devices are frequently employed where electronic pressure transducers are not available, where the environment is not conducive to the use of electronic devices, where a back-up measuring instrument is desired to assure a reading in the event of the failure of the electronic device, where there is a desire to verify the validity of the pressure gage signals be means of a direct mechanical effect produced by the presence of pressure transients, or where there exists the possibility of spurious effects producing false signals as frequently happens with electronic gages.

Prior art diaphragm overpressure gases have employed a device consisting of a rigid flat plate having a shallow cylindrical air cavity covered by a metal sheet, usually aluminum foil of uniform thickness. When exposed to a shock or blast pressure pulse of sufficient intensity, the foil will rupture. For a cylindrical cavity of a given diameter and foil of uniform thickness and properties, the overpressure at which rupture occurs is reproducible. Thus, the device can be used to determine whether the transient being measured exceeded or failed to exceed the particular discreet rupture overpressure of its design.

By using several of these prior art discrete pressure measuring diaphragm gages of varying cavity diameter and/or foil thickness, it is possible to bracket the value of the pressure to be measured. The use of a diaphragm gage that ruptures at pressure P1 together with a second that ruptures at a pressure P2, where P2 is greater than P1, in a single measurement event can establish whether or not pressure at these two gates have a peak overpressure value between P1 and P2. By adding more and more of these discrete pressure mounting diaphragm gages, it is possible to obtain greater precision. In the prior art, the number of cavities required, however, becomes excessive if precision in the measurement is to be achieved. Moreover, as the number of these cavities increases, the area that they cover becomes a significant impediment to efforts to obtain valid measurements, because the pressure can vary from point to point in the vicinity of the position where a pressure measurement is desired.

The continuous measuring diaphragm pressure gage or non-discrete diaphragm pressure gage of the present invention differs from the prior art in that it combines the features of a yielding diaphragm gage without rupture and a discrete diaphragm pressure gage where pressures are determined by the rupture of the diaphragms. The continuous measuring diaphragm pressure gage also differs from the prior art in that it replaces the cylindrical cavity behind the foil of the discrete diaphragm pressure gage in the prior art with a cavity having a wedge-shape, that is a cavity that has walls that vary the cavity width in a gradual manner from a narrow width to a wide width. In the preferred embodiment the cavity consist of two cylindrical sections cut across the cylinder diameter, one of large radius and one of small radius, joined by a wedge-shaped cavity section. However, any elongated cavity that has two opposing sides with edges sloping away from one another can be employed. This cavity is covered by a uniform foil sheet of metal or other deformable material. In the preferred embodiment this foil is secured in place by means of a cover plate having a cut-out pattern matching the cavity behind the foil so that a pressure pulse incident on the device will have unimpeded access to the foil covering the cavity. The cover plate can be calibrated for the pressure pulse magnitude by means of markings on the cover plate providing a reference by means of which the extent of rupture of the foil is measured along the axis of the cover plate opening.

Another important limitation of the prior art diaphragm pressure gage is that it is sensitive to the shock or blast wave form.

SUMMARY AND OBJECTS OF THE INVENTION

Therefore, it is an object of the invention to provide a pressure gage that can be used in various environments to measure the peak overpressure of pressure transients in various media, over a continuous and wide range of pressures.

It is further object of the invention to provide such a continuous range overpressure measuring capability in a device in which the number of components, cavity elements and/or overall size are reduced compared to the previous designs so as to permit the manufacture of a device that is convenient and practical to use, and yet retain the advantages of a mechanical overpressure measuring device.

It is a further object of the invention to provide a device that provides a distinctive mechanism whereby the overpressure reading is indicated and can be read directly from a graduated and continuous scale.

It is a further object of the invention to provide a device that is rugged and that can survive exposure to the conditions encountered in explosive and other shock producing events.

It is a further object of the invention that, while providing continuous measurement of the peak overpressure, the device operates independently without the requirement of communication lines to external power supplies or recording devices.

It is a further object of the invention to provide a continuous scale overpressure measuring device by means of equipment that manifests a direct mechanical effect produced by a transient or shock pressure pulse event without the intervention of a transducer (mechanical to electrical or mechanical to optical for example) and without the necessity or intervention of separate recording devices. In other words, the invention is to provide a means such that the direct physical effects of a transient or shock pressure pulse mechanically deforms an element or elements of the device in such a way that this deformation can yield pressure readings from a scale on the device, or from a scale that can be placed on the device for measurement readings, or that in other ways can be calibrated to yield overpressure readings, so that spurious effects, effects that are not caused by the pressure pulse itself, cannot yield false readings in the device.

It is further object of the invention to provide a diaphragm pressure gage that will be less dependent on the pressure pulse wave form.

It is a further object of the invention to provide a gage that yields accurate and reliable pressure readings for normal incidence shock or blast pressure pulses or shock or blast pressure pulses incident side-on or at oblique angles to the diaphragm.

DESCRIPTION OF THE PREFERRED EMBODIMENT

Figure 1:
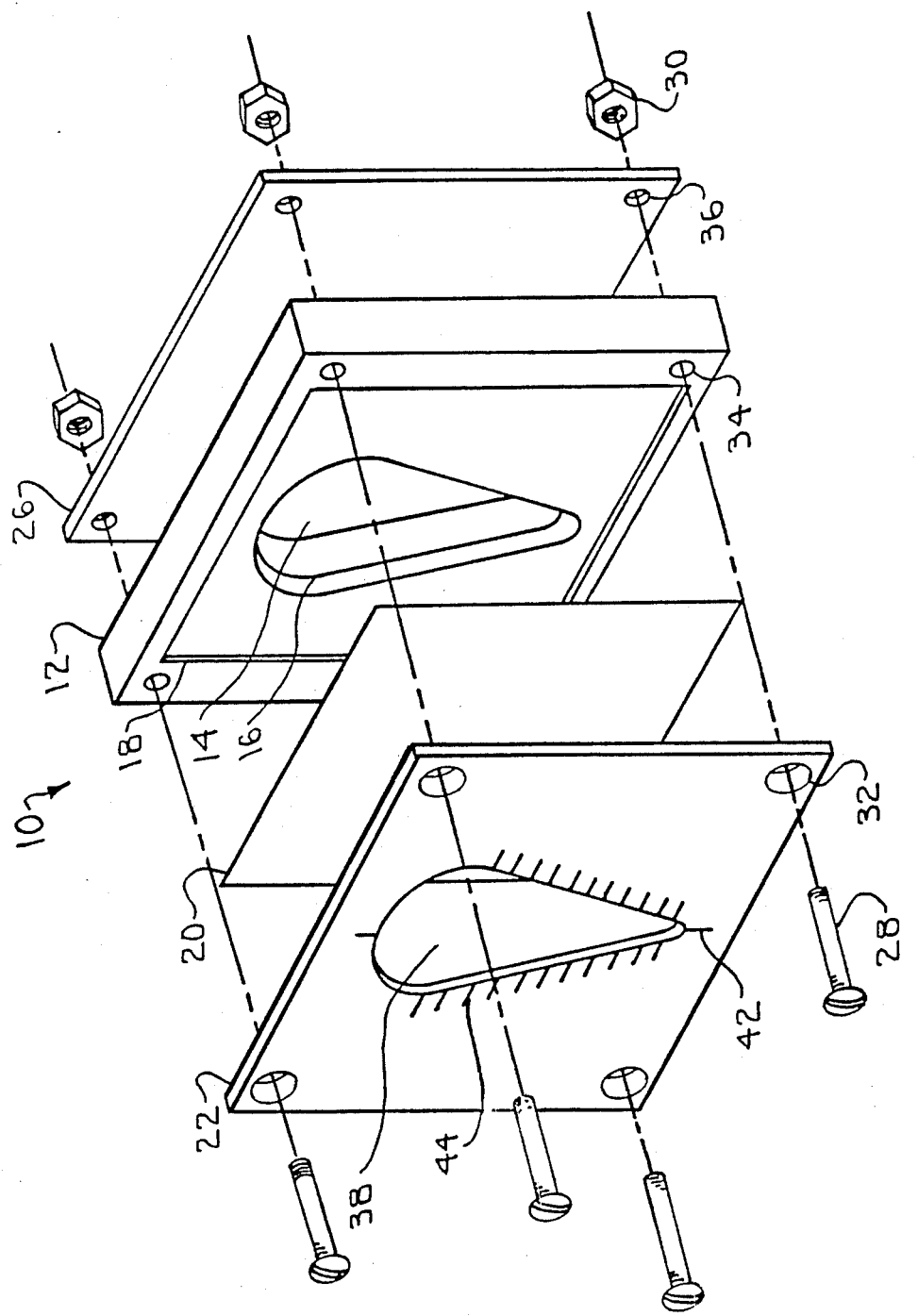
FIG. 1 is an exploded and perspective view of the elements of the continuous measuring diaphragm pressure gate of the preferred embodiment of the invention.

FIG. 1 shows an exploded view of the parts of present invention in its preferred embodiment. The pressure gage device 10 includes a rigid plate member 12 made of aluminum having a wedge shaped cavity 14 preferably with rounded ends and beveled edge 16. The face of the plate member 12 contains a recess 18 adequate to accept a foil sheet 20 which constitutes a diaphragm, but sufficiently shallow to hold the foil sheet 20 securely in place when a cover plate 22 is placed over the cavity plate member 12. A bolt 28 having screw threads is inserted through holes 32, 34, 36 of cover plate 22, plate member 12, and back plate 26, respectively, and secured with a nut 30. The thickness of plate 12 is preferably thick enough so that deformation of the foil diaphragm 20 resulting from shock or blast pressure thereon will not result in the deformed foil making contact with the back plate 26.

Figure 4:
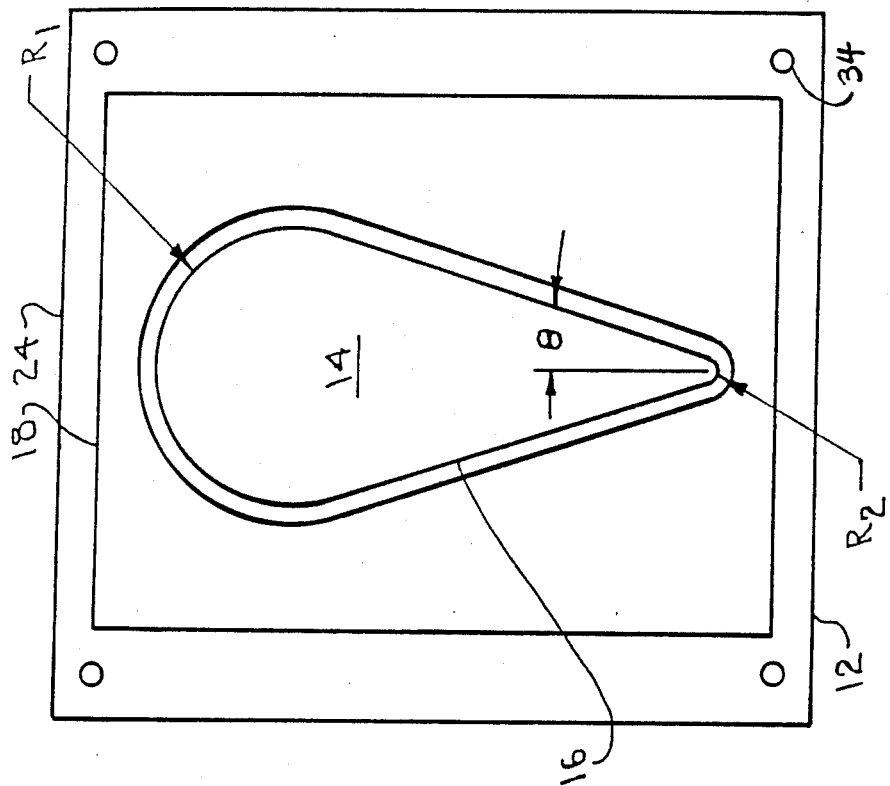
FIG. 4 is a front view of the cavity plate of the continuous measuring diaphragm pressure gage.

The cover plate 22 is preferably made of steel. The plate 22 has a through hole or opening 38 having an wedge-shaped configuration as seen in plan view of FIG. 3 matching the shape of cavity 14 in plate 12, as seen in FIG. 4. The opening 35 preferably overlaps the bevel in the cavity 14 of plate 12.

Figure 3:
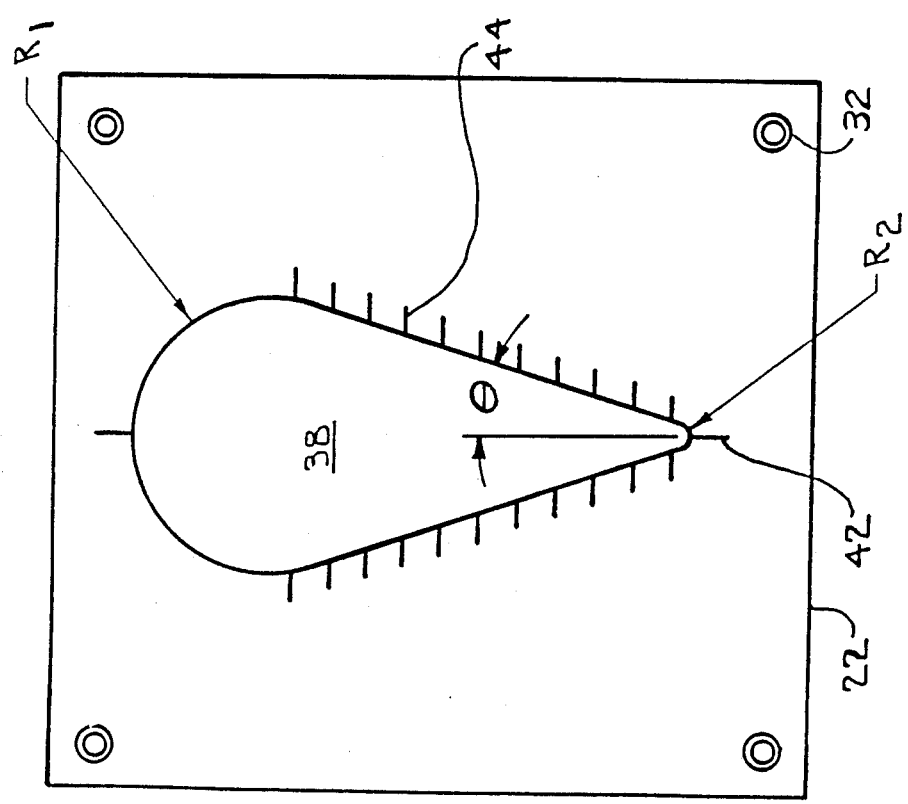
FIG. 3 is a front view of the front element of the continuous measuring diaphragm pressure gage.

With reference to FIG. 3 the plate 22 preferably has alignment markings 42 and calibration markings 44. The alignment markings 42 permit alignment with a ruler or straight edge along the axis of symmetry of the opening 38 in plate 22. The alignment markings aid in finding the extent of the depression in the foil 20 along the axis of symmetry produced by shock fronts that are incident on the gage at an angle other than normal to the face of plate 22 and thereby produced an asymmetric or skewed depression or rupture in the foil. The position of the foil rupture in foil 20 extending farthest toward the narrow portion of cavity 14 or opening 38, in the direction of the axis of symmetry as indicated by the markings 42 determines the position along the calibration markings 44 to be read to obtain the pressure readings. The calibration markings 44 make possible the direct pressure readings from the scale or the reading of code values for the markings that can be used with a look-up table or graph containing the overpressure corresponding to the code reading using foils of different thickness and material, it is possible to tailor the use of the gage to a particular range of pressures, thereby obtaining a more exact pressure reading. However, it is readily apparent that a particular pressure reading is an individual measurement reading of a peak pressure of a pressure range that exceeds a threshold pressure sufficient to rupture the foil diaphragm 20.

The foil 20 consists of a flat sheet of a deformable or malleable material, uniform in its properties throughout the sheet and of uniform thickness. The dimension of the sheet are such that the sheet fits between plates 22 and 12 and where provided fits into recess 18 or where said recess is omitted, foil 20 should not obstruct the attachment holes 32 and 34. Foil 20 should uniformly cover the cavity 38. The use of aluminum foil in the annealed condition of the metallic foil 20 has been found to provide accurate and repeatable reading of overpressure.

The back plate 26 is preferably made of steel and covers the cavity 14 in plate 12. The back plate 26 seals the cavity 14 from the back side of the gage to prevent pressure or shock reflections from entering the rear of cavity 14 in plate 12 which would thereby interfere with the process of deformation of the foil 20.

Figure 2A:
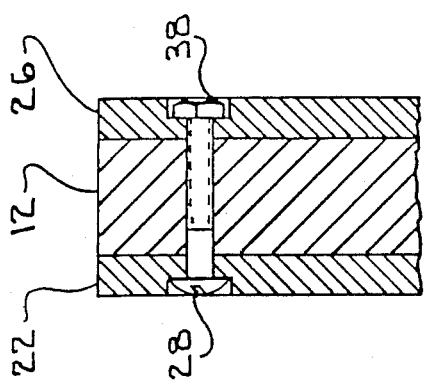
FIG. 2a is another cross sectional view of of the elements of the continuous measuring diaphragm pressure gage in the assembled configuration.
Figure 2:
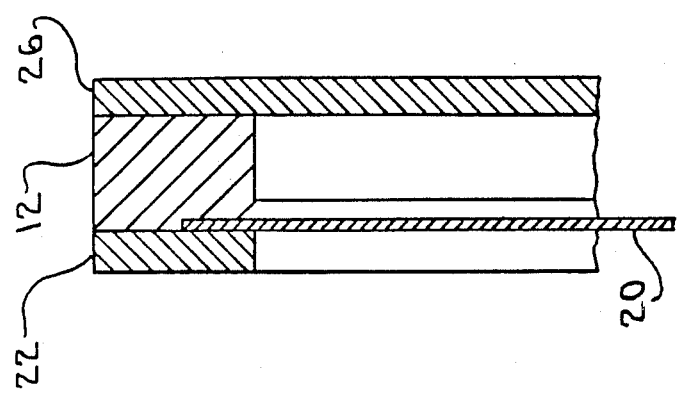
FIG. 2 is a cross sectional view of the elements of the continuous measuring diaphragm pressure gage in assembled configuration.

The attachment of the foil 20 and the back plate 26 to plate 12 in the order shown in FIG. 1, employing the cover plate 22 together with the bolt and nut assembly 28, 30 is shown in FIGS. 2 and 2A. This provides a sealed cavity 40 with preferably air at atmospheric pressure as the reference pressure against which the pressure pulse to be measured acts during the deformation of the foil. Other gasses or even deformable liquid or solid media could be employed where stiffer resistance is desirable or where overpressure readings in other media is desired.

FIG. 2 illustrates the assembled configuration of the continuous measuring diaphragm pressure gage in a cross sectional view, the cut taken perpendicular to the face of the gage along the plane of symmetry of the cavity 14 in plate 12.

FIG. 2a illustrates another cross sectional view, the cut being taken perpendicular to the face of the gage through a cross section of one of the bolt screws 28 with its respective assembled nut 30 positioned within the bolt holes 32, 34 and 36.

FIG. 3 shows a front view of the continuous measuring diaphragm pressure gage 10. With the exception of the bolt screws 28, this is the name for a front-on view of the assembled gage. FIG. 3 shows the alignment markings 42 indicating the symmetry axis of the opening 38; and the scale or calibration markings 44 are shown on either side of the wedge shaped section of the opening 38. The angle of the wedge shaped section should be as small as practical to increase the fineness of the scale division 44 and thus the precision of the overpressure measurement. However, use of a larger one permits the overall dimension of the gage to be kept compact. The ends of the wedge-shaped section of the opening is capped by a smooth curve section, preferably a cylindrical section at each end as shown in FIG. 3, with the line of the wedge-shaped section continuing without discontinuity into the lines of the circular sections. The radius R1 determines the lower bound of the pressure range of the gauge, while the radius R2 determines the upper bound of the pressure range of the gage.

FIG. 4 is a front view of the cavity plate 12 of the continuous measuring diaphragm pressure gage showing the cavity 14 that except for the bevel 16 corresponds to the opening 38 in plate 22. The radius R1, wedge angle and radius R2 serves the purpose and are limited by the same constraints as in the description of plate 22 above. FIG. 4 also shows preferably the recess 18 for accepting the foil 20 and the bolt hole 34. The plan view of the foil 20 preferably has a square configuration and fits in the recess 18 of plate 12. The recess 18 in plate 12 has been shown on the front side of plate 12, but it may be constructed instead on the back of cover plate 22, or in both plates 22 and 12 or take some other form to hold the foil therein. The recess 18 serves only as a convenience to the placement of the foil 20 during assembling of the gage.

While we have described and shown the particular embodiment of our invention, it will be understood that many modifications may be made without departing from the spirit thereof, and we contemplate by the appended claims to cover any such modifications as fall within the true spirit and scope of out invention.

We claim:

1. A mechanical pressure gage for measuring the peak pressure of a pressure range of a fluid comprising:
    a housing including:
    a first plate member having a wedge-shaped opening centrally located and extending therethrough;
    a second plate member having front and back sides;
    said front side having a recess;
    diaphragm means being frictionally positioned in said recess and being deformed in a mechanical and ruptured manner by a peak pressure that exceeds a threshold pressure sufficient to rupture said diaphragm means;
    a third plate member forming a back support for said second plate member;
    said first, second, and third plate members being fixedly attached on their respective outer edges; and
    scale marking means located adjacent to the edge of said wedge-shaped opening for measuring said peak fluid pressure.

2. The mechanical pressure gage according to claim 1, wherein said first plate member constitutes a cover for said housing.

3. The mechanical pressure gage according to claim 1, wherein said diaphragm means constitutes a metallic foil sheet.

4. The mechanical pressure gage according to claim 3, wherein said metallic foil sheet consists of an uniform thickness sheet of aluminum material.

* * * * *